United States Patent [19]

Doi

[11] Patent Number: 4,740,679
[45] Date of Patent: Apr. 26, 1988

[54] DISC FOCUS SERVO-CIRCUIT WITH ORDERED REFERENCE LEVEL SETTING MEANS

[75] Inventor: Masanori Doi, Akishima, Japan

[73] Assignee: Olympus Optical Co., Ltd., Tokyo, Japan

[21] Appl. No.: 832,810

[22] Filed: Feb. 25, 1986

[30] Foreign Application Priority Data

Feb. 27, 1985 [JP] Japan ................... 60-40010
Mar. 13, 1985 [JP] Japan ................... 60-49549

[51] Int. Cl.⁴ ........................................... G01J 1/20
[52] U.S. Cl. ........................................ 250/201; 369/45
[58] Field of Search ................... 250/201 DF, 201 AF; 369/44, 45, 46

[56] References Cited

U.S. PATENT DOCUMENTS

| | | | |
|---|---|---|---|
| 4,446,546 | 5/1984 | Miller | 369/45 |
| 4,541,084 | 9/1985 | Oku et al. | 250/201 DF |
| 4,544,837 | 10/1985 | Tanaka et al. | 369/45 |

*Primary Examiner*—David C. Nelms
*Assistant Examiner*—Jessica L. Ruoff
*Attorney, Agent, or Firm*—Armstrong, Nikaido, Marmelstein & Kubovcik

[57] ABSTRACT

In order to focus light beams which are projected onto an optical recording medium, the focusing optical system is moved in a vertical direction to the surface of the recording medium. A focus error signal produced by receiving the light returning from the recording medium is compared in turn with a predetermined plurality of reference levels. A focus servo-means is operated when this signal reaches the reference level within the focus pull-in region after passing through a predetermined order of reference levels.

15 Claims, 7 Drawing Sheets

MOVING DISTANCE
DUE TO INCREMENT
BY 1 BIT

INTERVALS FOR FORTY SAMPLINGS

DISC FOCUS SERVO-CIRCUIT WITH ORDERED REFERENCE LEVEL SETTING MEANS

FIELD OF THE INVENTION AND RELATED ART STATEMENT

This invention realtes to a focus servo-circuit for focusing an optical system to optically record or reproduce signals in a photodisc or photomagnetic disc device.

Photomagnetic effect and photodiffraction phenomenon are used by an optical means which writes information into an optically reproducible medium (which shall be called a disc hereinafter) or which reads information out of an already recorded disc. The photomagnetic effect is applied to a photomagnetic disc device so that the information may be freely written in and erased. The photodiffraction phenomanon is already used by a compact disc player or photodisc player. A focus servo-means which projects minutely throttled light beams onto a disc irrespective to the face deformation of the disc is indispensable to such a means that writes-in and reads-out or a means that only writes-in or only reads-out as is mentioned above. Generally, the focus servo-means is provided to detect a focus error signal (which shall be mentioned as an FE signal hereinafter). The focus servo-means is to make a spot of the beams follow the displacement of the deformation of the face of the disc on the basis of the detected FE signal. Some of the methods used to obtain this signal are an astigmatism method, a skew beam method, a knife edge method and a critical angle method.

FIG. 1 shows an example of a FE signal characteristic obtained by the above mentioned astingmatism method. In the diagram, the ordinate represents the levels of the FE signal $S_{FE}$ and the abscissa represents the relative distances between an objective lens and the disc. The signal will be obtained when the disc moves through the entire focus range (depth) of the objective lens. The signal will be a difference signal in the amount of light between paired opposite light receiving surfaces when a spot of beams is projected onto a photodetector made by dividing a light receiving surface into quarters. The photodetector serves as a the detecting means. The one feature of this signal is that, for example, the signal will represent the maximum level point $S_1$ when the disc approaches the focus within the focal distance of the objective lens. The signal will also represent the minimum level point $S_2$ when the disc approaches the focus from far away (an opposite case also exits). An exact or just focus point $L_J$ is located substantially in the intermediate position between the relative distances $L_1$ and $L_2$ at which the respective maximum and minimum levels are obtained. The signal level at $L_J$ is a substantially intermediate level between $S_1$ and $S_2$. Therefore, if an actuator means, which drives the objective lens, is applied with an FE signal level between $S_1$ to $S_J$ when the relative distance with the objective lens and disc is between $L_1$ to $L_J$ and is applied with an FE signal level between $S_J$ to $S_2$ when the relative distance is between $L_J$ to $L_2$, the objective lens will always be held at the exact or just focus point $L_J$ and the distances $L_1$ to $L_2$ will represent a focus pull-in region.

The device of the prior example, is so difficult to initially precisely set the disc in the pull-in region, with respect to the optical system, that the focus position is detected by moving the objective lens with respect to the set disc to pass through the focus position by gradually approaching from a separate position from the disc. When the objective lens is detected as having entered the object focus pull-in region, the servo-means will then be applied.

However, the focus servo-means pull-in region is so narrow that, even if the servo-loop is closed as soon as the focus position is detected, due to the transmission delay of the circuit, when the servo-means is actually applied, the objective lens will have been already displaced out of the pull-in region. Even if the servo-means is applied in this state, the focus state will not be able to be set and therefore a mis-operation occurs.

In the above mentioned prior example, usually the objective lens is moved in a direction X approaching the disc from a position far from the disc. However as shown in FIG. 1, the FE signal has a quasi-focus point c having the same level as $S_J$ and therefore a defective focal position is detected.

OBJECTS AND SUMMARY OF THE INVENTION

An object of the present invention is to provide a focus servo-circuit which can be positively set at a just or an exact focus point.

Another object of the present invention is to provide a focus servo-circuit which can be effectively set an exact focus point.

A further object of the present invention is to provide a focus servo-circuit having a wide range of applications.

According to the present invention, a means is provided for comparing a plurality of ordered reference levels which are set in response to the various level variation characteristics of the focus error signals when an optical system, which projects light beams onto a recording medium, is moved in a vertical direction to the surface of the recording medium. The various levels of the focus error signals, when the optical system is actually moved, is provided so that, when respective reference levels are crossed in a predetermined order and the reference level within the focus pull-in region is reached, the focus servo-means will be operated.

BRIEF DESCRIPTION OF THE DRAWINGS

FIGS. 2 to 5 relate to the first embodiment of the present invention.

FIG. 2 is a circuit block diagram showing an example of a principle formation of the first embodiment.

FIG. 3 is a formation diagram showing a focus servo-circuit of the first embodiment.

FIG. 4 is a flow chart showing the operation of the first embodiment.

DETAILED DESCRIPTION OF PREFERRED EMBODIMENTS

Figure 2:
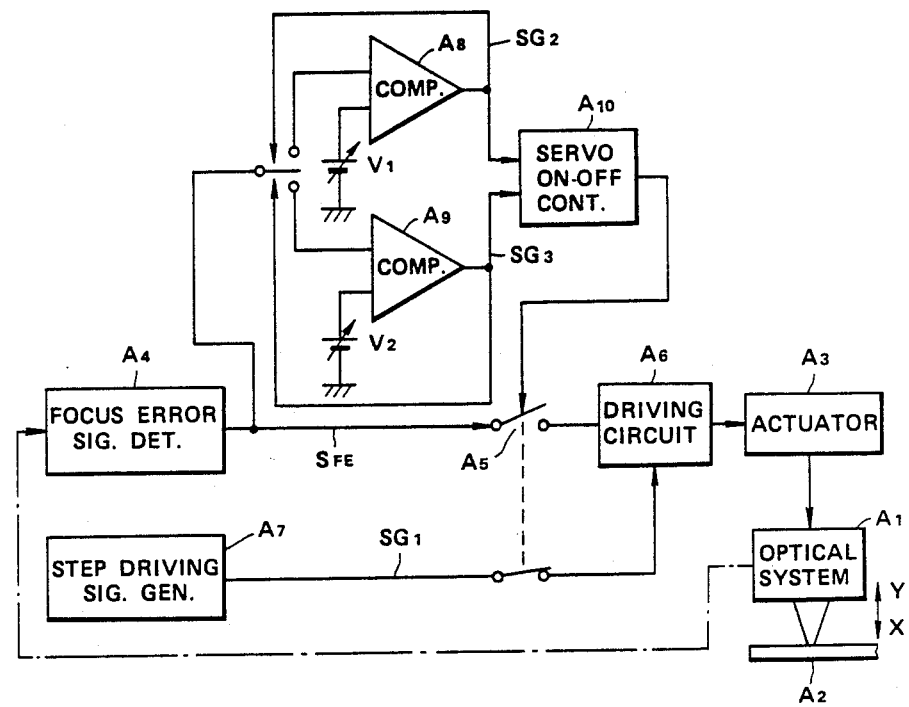

First, the principal formation of the present invention shall be explained with reference to FIG. 2.

The focus servo-mechanism is a means of servo-controlling an exact focus of an optical system $A_1$ having an objective lens. The servo-mechanism drives the optical system in directions X (near/close) and Y (far/away) relative to a disc-shaped recording medium $A_2$. The servo-mechanism is provided with an actuator $A_3$ which drives at least the objective lens of the optical system $A_1$ in the X and Y directions. An error signal detecting means $A_4$ detects a focus error signal $S_{FE}$ based on reflected beams from the recording medium $A_2$. A switching means $A_5$ switches the output of the detecting means $A_4$ on and off. A driving circuit means $A_6$ amplifies the electric power of the focus error signal $S_{FE}$ coming through the switching means 5 and feeds the signal to the actuator $A_3$. A step driving signal generating means $A_7$ is provided. When the switching means $A_5$ is off, a signal $SG_1$ of a predetermined level will be generated by the step driving means 7 and will be applied to the driving circuit means $A_6$. The objective lens will be brought closer to the recording medium $A_2$ (initially set) so as to be in a position below the focal distance. The objective lens will be moved away from the recording medium $A_2$ by steps from the initially set position and will be moved into the focus pull-in region. First and second comparing means $A_8$ and $A_9$ have the focus error signal $S_{FE}$ input under the control the means $A_7$ to a first input of each comparing means. First and second variation point levels $V_1$ and $V_2$ correspond to at least two point positions in the far and near variable ranges of the objective lens. The first and second variation point levels are input at the other input to the comparing means $A_8$, $A_9$. At least one of these signal levels, for example, $V_2$, is set at a signal level corresponding to any position within the focus pull-in region. The outputs $SG_2$ and $SG_3$ of these comparing means $A_8$ and $A_9$ are input to a servo-start controlling means $A_{10}$. When both of these respective outputs of the comparing means $A_8$ and $A_9$ present a signal showing that the signal $S_{FE}$ from the error signal detecting means $A_4$ is equal to or crosses the signal levels $V_1$ and $V_2$ in a predetermined order, the switching means $A_5$ will be turned on and the servo-loop, consisting of the optical system $A_1$, focus error signal detecting means $A_4$, driving circuit means $A_6$, actuator $A_3$, and optical system $A_1$, will be closed.

The present invention is to start the operation of the servo-circuit after confirming that the objective lens has entered the focus pull-in region. Therefore, in this embodiment, the variation point of the FE signal is detected with a microcomputer (which shall be called a CPU hereinafter) 11. In the principal formation diagram shown in FIG. 2, the CPU 11 performs the respective functions of the step driving signal generating means $A_7$, first and second comparing means $A_8$ and $A_9$ and servo-start controlling means $A_{10}$. The CPU is explained in detail in the following.

Figure 3:
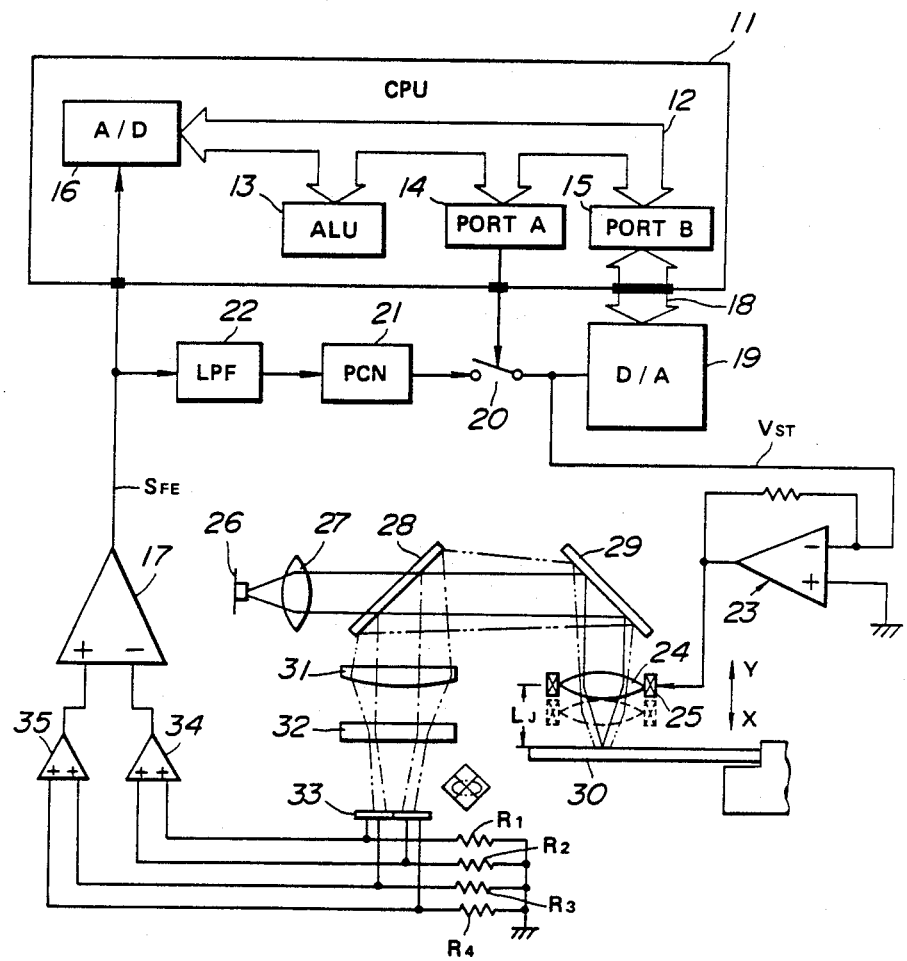

In FIG. 3, the CPU 11 controls a logical operation part 13, port A 14 and a port B 15 through a bus line 12 and connects and an analog-digital converter (which shall be called an A/D converter hereinafter) 16 to the bus line 12. A focus error signal $S_{FE}$ output from a differential amplifier 17 is input into the A/D converter 16. The focus error signal is made by sampling L digital data points at a high speed by a control timing of othe CPU 11. The port B 15 is connected to the D/A converter 19 through the bus line 18 and inputs a digital signal into the D/A converter 19. The digital signal value is varied synchronously with the above mentioned control timing as it inputs into the D/A converter 19.

A step driving signal $V_{st}$ for slightly steppedly displacing a later described objective lens is output by the D/A converter 19. The output of the port A 14 is to control an on/off switch 20 connected at one end to the output end of the D/A converter 19. The switch 20 is connected at the other end and to an input and output path of the A/D converter 16 and differential amplifier 17 through a phase compensation circuit (PCN) 21 and low pass filter (LPF) 22.

Figure 4:
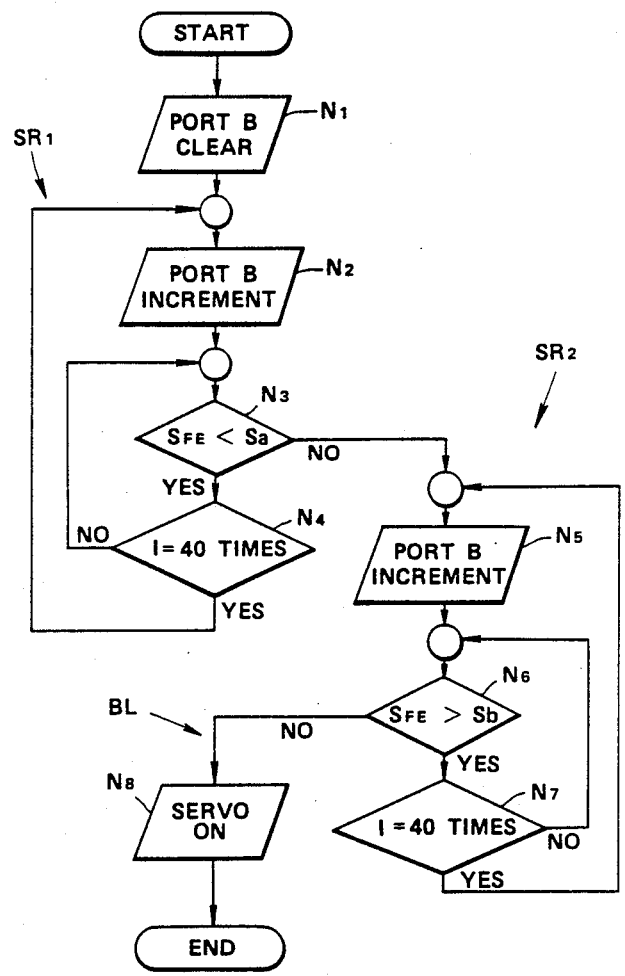

The CPU 11 has a memory means for storing program data for carrying out the program shown by the flow chart in FIG. 4 and for storing various numerical value data for detecting reference points in the present invention. The stored data causes the objective lens to gradually move away from the side near the disc in pulling in the focus servo means. The stored data represents focus error signals $S_{FE}$ shown in FIG. 1.

Figure 1:
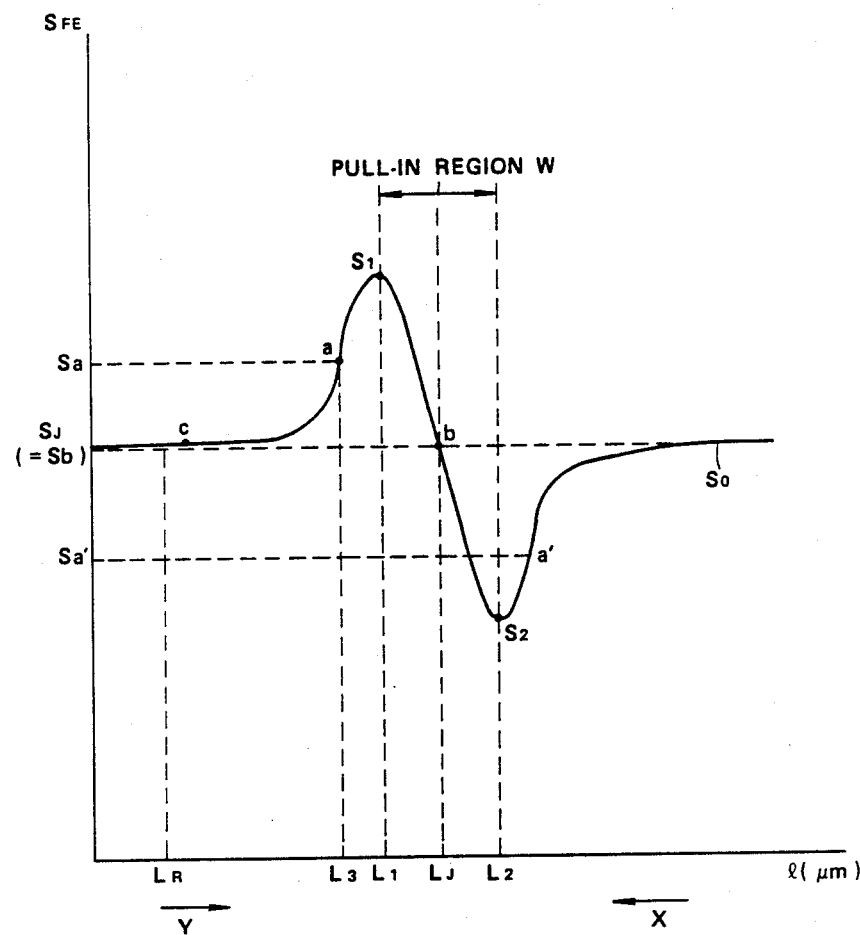
FIG. 1 is a characteristic diagram showing focus error signal characteristics produced using an astigmatism method.

The level $S_a$ at a is determined in response to any position $L_3$ in the range in which the distance 1 between the objective lens and disk is $0<1<L_1$. The level $S_a$ determined in response to the distance $L_3$ in FIG. 1 is to confirm that the objective lens is passing the rising part $(0<1<L_1)$ of the focus error signal. The level $S_b$ at b is determined to correspond to any position in the range of $L_1<1<L_2$. In FIG. 1, the level $S_b$ is determined to correspond to the just focus point $L_J$. The level $S_b$ ($=S_J$) is to confirm that the objective lens is within the focus pull-in region. Thus, whenever the focus error signal is sampled and the conversion value is output by the A/D converter 16 at a predetermined timing, the CPU 11 will then read out the value to be compared from the memory means and will compare the stored values with the sampled signals at these variation points a and b. What is important is not that the focus error signal is merely sampled at fixed intervals and the servo-means is applied in the logical product in which both points a and b are detected, but the program detecting the point a and the program detecting the point b are independent from each other. That is to say, when the sub-routine of detecting the point a ends, the sub-routine of detecting the point b will be carried out to positively detect the point b.

Now, the connecting point of the D/A converter 19 and on-off switch 20 is connected to one input end of a driver 23 which is grounded at the other input end. The output of the driver 23 is connected to an actuator coil 25 for moving the objective lens 24 which functions as a light collecting lens. The lens 24 moves in the directions X and Y indicated by the arrows. By this formation, the objective lens 24 is moved in the X and Y directions of the disc in response to the output level of the driver 23.

The reference numeral 26 represents a light source such as a semiconductor laser. A collimator lens 27 is in front of the light source 26 so that light beams passing through the lens 27 may pass through a beam splitter 28 and may be incident on a mirror 29 which is set to lead the reflected light to a disc 30 supported by a turntable. The objective lens 24 is located between the mirror 29 and the disc 30. A light collecting lens 31 is provided on the reflecting surface side of the beam splitter 28. The light collecting lens 31 leads the light beams collected by the light collecting lens 31 onto the flat surface of a columnar lens 32. The light beams passing through the columnar lens 32 are projected onto a quarterly-divided photodetector 33. When the objective lens 24 and disc 30 are separated from each other by the focus distance of the objective lens 24 (in the just focus state), as indicated by the one-point chain line, a true circular spot will be made on the light receiving surface of the photodetector 33. Thus, the respective divided light receiving surfaces will receive equal amounts of light. When the distance between the disc 30 and the objective lens 24 deviates from the (just) focus point, as indicated by the two-point chain lines, an elliptic spot having a longer diameter, corresponding to the deviating distance, will be made. The long diameter direction of the elliptic spot will coincide with the geometrical direction of the pair of light receiving surfaces of the photodetector. The polarity and level of the output of the photodetector 33 will vary in response to the direction and distance deviated from the (just) focus point.

The respective divided light receiving surfaces of the photodetector 33 are connected to ground respectively through resistances $R_1$ to $R_4$ so that signal voltages corresponding to the respective received light amounts may be generated at both ends of the resistances. The voltages at both ends of the resistances $R_1$ and $R_2$ represent signals output by a pair of light receiving surfaces on one side of the photodetector. The voltages at both ends of the resistances $R_3$ and $R_4$ represent signals output by a pair of light receiving surfaces on the other side fo the photodetector. The signals from the resistances $R_1$ and $R_2$ are respectively input into an adder 34 and the signals from the resistances $R_3$ and $R_4$ are respectively input into an adder 35. The output of these respective adders 34 and 35 are connected to the differential amplifier 17.

The present invention is formed as described above. The operation of the invention will be explained with reference to FIGS. 4 and 1. The FE signals can be detected by a method wherein the objective lens 24 is moved away from the disc 30 (from any point close to the focus servo-means pull-in region) or a method wherein the objective lens 24 is moved closer to the disc 30 from a point far away from the disc (from any point far away from the focus servo-means pull-in region). In this embodiment, the former shall be adopted (in the latter, the point a' may be detected instead of the point a).

First of all, as mentioned above, the point a data of the FE signal inside the pull-in region and the point b data of the FE signal, corresponding to the focus point $L_J$ within the pull-in region, are stored in the CPU 11. The output of the port A 14 is set to keep the on-off switch 20 in an off position.

In the initial state of the circuit is thus set, the program, shown by the flow chart in FIG. 4, will start. The flow chart consists of two sub-routines $SR_1$ and $SR_2$ and a branch BL.

The first step $N_1$ of the routine $SR_1$ is to clear the data from the port B 15. The port B 15 will input initial data into the D/A converter 19, which will output the data as a step driving signal onto the actuator coil 25 through the driver 23. The objective lens 24 will be displaced to the position indicated by the dotted lines in FIG. 3. This displaced position is a state in which the objective lens 24 has approached the disc 30 from the point $L_J$. At this time, the light beams, having passed through the columnar lens 32, will be projected as an expanded beam (or an enlarged beam) onto the light receiving surface of the photodetector 33. The FE signal $S_{FE}$ output from the differential amplifier 17 will be on a higher level than the level at $L_J$, the level $S_J$ as, for example in FIG.

Figure 5A:
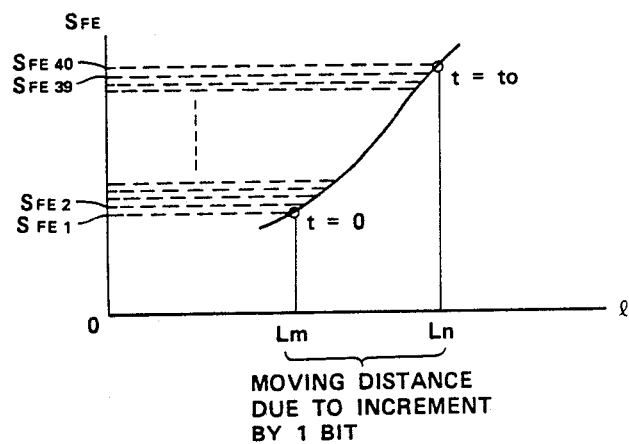
FIGS. 5a and 5b are explanatory diagrams showing the operation of the first embodiment.
Figure 5B:
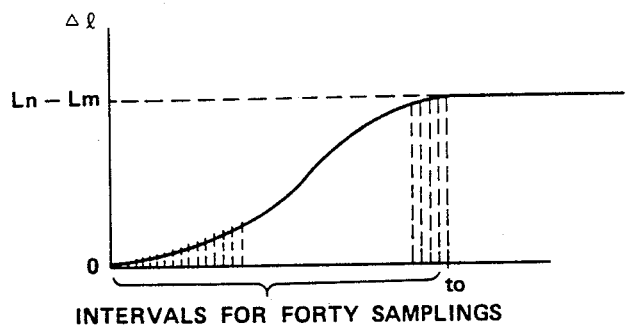

1. Then, the contents of the port B 15 will be increased by 1 bit when the process at step $N_2$ is carried out. The step driving signal $V_{ST}$ will be decreased, for example, by 1 step and will slightly displace the objective lens 24 in the direction Y. Using FIGS. 5a and 5b, when the port B 15 is increased by 1 bit, the objective lens 24 will move from a point Lm from the disc 30 to the point Ln. The objective 24 will move gradually by the curve shown, for example, in FIG. 5b. In FIG. 5b, the distance represented is represented on the ordinate and the time is repreesnted on the abscissa. The objective lens 24 will complete the movement to the point Ln at $t=t_o$. FIG. 5a indicates the FE signal $S_{FE}$ fluctuating with this movement. The value of $S_{FE}$ is input as a digital value into the ALU 13 by the A/D converter 16 a plurality of times (for example, 40 times) with the movement from Lm to Ln (called sampling hereinafter). In FIG. 5a, $S_{FE1}$, $S_{FE2}$, ... $S_{FE39}$, and $S_{FE40}$ are read in as digital values. The values of $S_{FE1}$ to $S_{FE40}$ are compared in turn at step $N_3$ with signal $S_{FE}$ at the point a. The step $N_3$ is to determine whether $S_{FE}$ is less than the data stored for point a. If $S_{FE}$ is smaller, the process will move to the next step $N_3$ but, if $S_{FE}$ is not smaller, the process will move to the later described sub-routine $SR_2$. The step $N_4$ is to determine the sampling number I, that is to say, the number of times $S_{FE}$ is smaller than the stored data for point a. In the embodiment, the sampling number step $N_4$ is made, for example, 40 times. Therefore, if the number of times $S_{FE}$ is smaller is summed and the sum of the times is not 40 times (NO), the process will again return to the comparison step $N_3$. If $S_{FE} \geq S_a$ is determined by the step $N_3$ before 40 times, the process will move to the subroutine $SR_2$. The determination of $S_{FE} \geq S_a$ shows that the point a level in FIG. 1 is detected.

If $S_{FE} < S_a$ can not be determined even after 40 times of sampling, the process will return to the step $N_2$ as the point a is not in the range from Lm to Ln and the point a level will be again detected from that position.

The sub-routine $SR_2$ is a program for detecting a focus error signal level corresponding to the point b. That is to say, when a negative result is obtained from step $N_3$ of the previous routine $SR_1$, the CPU 11 will move to the step $N_5$. This step corresponds to the step $N_2$. When the data of the port B 15 is further increased by one bit and the step driving signal $V_{ST}$ is decreased, the objective lens 24 will be further stepped closer to the position $L_J$ corresponding to the point b. The step $N_6$ is made for movement of the lens 24 for the distance corresponding to 1 bit. This comparison $N_6$ also corresponds to the comparison $N_3$ of the routine $SR_1$. When $S_{FE} > S_b$, the process will proceed to the step $N_7$ to determine the sampling number a number of times. When $S_{FE} \geq S_b$, the process will proceed to the branch BL. Step $N_7$ is a step of the program for determining the number of sampling times during the movement of the lens by one step (1 bit). When the sampling number is made I (or 40) times and the point b level is not obtained (YES), the process will return to step $N_5$. When the sampling number is less than 40 and the point b level is not detected, the process will return to the comparison step $N_6$. This routine will be repeated until the point b level is detected. The larger the sampling number in the sub-routines $SR_1$ and $SR_2$, the higher the precision of detected each position. On the other hand, the fewer the samplings, a shorter time will be taken for the focus search. Therefore, a proper number of samplings is set by matching both the precision desired and the amount of search time needed.

When $S_{FE} \leq S_b$ is determined in comparison step $N_6$, the process will proceed to the branch BL and the process step $N_8$ will be carried out. Step $N_8$ initiates the starting of the servo-means to the port A 14 so that a signal may be output from the port A 14 to turn on the switch 20. Naturally, this means that the servo-loop consisting of the actuator coil 25, objective lens 24, disc surface, objective lens 24, photodetector 33, adders 34, 35, differential amplifier 17, low pass filter 22, phase compensating circuit 21, switch 20, driver 23 and actuator coil 25 will be turned on. At this time, the objective lens 24 will be in or near the position of $L_J$ in the range of $L_J$ to $L_2$.

Thus, in the present invention, when the objective lens 24 is confirmed to be in the focus pull-in region, the servo-means will be able to be operated.

The second embodiment of the present invention shall be explained in the following with reference to FIG. 4. The difference from the preceding embodiment is that, in step $N_2$ of the previous embodiment, the distance of moving one increment corresponds to one bit. In the second embodiment, the distance of moving one increment corresponds to a plurality of bits (for example, 3 bits). (A plurality of bits shall be called one step hereinafter.)

In this embodiment, since the variation level per step of the step driving signal is higher than in the preceding embodiment, depending on the selection of the point a $S_{FE1} \geq S_a$ may be detected, in the first pass through of the subroutine $SR_1$. The reasons why the sampling intervals may be made so coarse is because the characteristics of the focus error signal slowly change in the region inside the focal distance (outside the pull-in region W). Thus, even if the sampling intervals are expanded, this region will not be passed over. In the second embodiment, the lens is moved every 3 bits (1 step) in the routine $SR_1$ but is moved every 1 bit in the routine $SR_2$. However, the invention is not limited to this. Even in the routine $SR_2$, a plurality of bits may be moved.

In the respective first and second embodiments, the point b need not coincide with the just focus point and may be set at any variation point in the pull-in region. When point b is to be set particularly in the range of $L_1$ to $L_J$ (exactly somewhat below $L_J$), the point a level and point b level may be the same value, because the present invention is not to start the servo-means by the logical product merely by the point a and b levels being detected. Rather, the routines for detecting the respective points are independent of each other and the order of carrying them out is determined.

The third embodiment can be applied to the critical angle method or knife edge method and shall be explained in the following. The critical angle method and the knife edge method per se are known methods.

Figure 6:
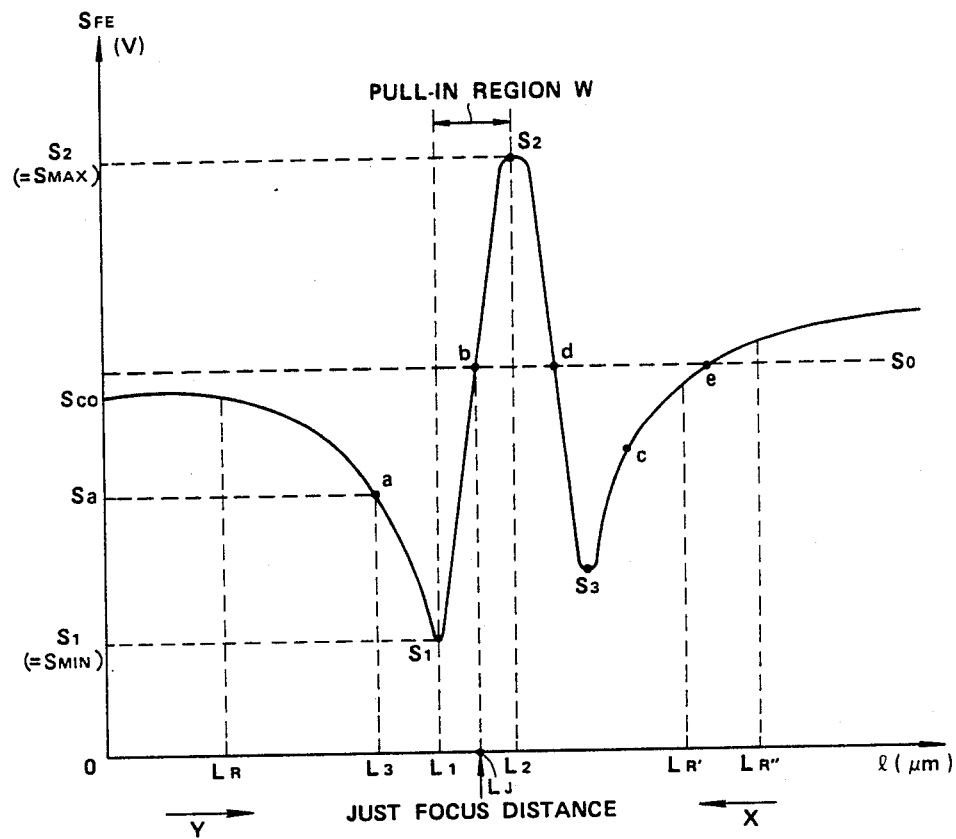
FIG. 6 is a characteristic diagram showing focus error signal characteristics according to the third embodiment of the present invention.

In these methods, the FE signal varies as FIG. 6. Therefore, when the lens is moved in the direction Y from the position of $L_R$ near the disc, the same as in the first and second embodiments, the levels a and b may be detected.

The manner of moving the objective lens 24 in the direction X from any point farther away from the disc than the servo-means pull-in region or, for example, from the position of $L_R'$ shall be explained. First of all, if a substantially average value point c, for example, between $S_3$ and $S_J$ is selected as a detecting point outside the pull-in region W, since the characteristics of the FE signal have the minimum point level $S_3$, which is lower than $S_J$ at a point away from the pull-in region as described above, the $S_J$ level will be crossed during the variation to the maximum point $S_2$ entering the pull-in region from $S_3$. The variation point presenting the same level as the $S_J$ level shall be denoted by d. That is to say, in the third embodiment, the points c, d and b are to be detected in the order mentioned. The detecting point d may be on any level in the range of $S_2$ to $S_3$. In order to detect three such points, in this embodiment, the CPU 11 repeats the same routine as a routine of further detecting the point d level even after detecting points c and d.

As in the above, in the present invention, the pull-in region is to be positively detected by detecting the level of any point outside the pull-in region.

The present invention can be applied also to an FE signal detecting method as a skew beam method.

The fourth embodiment of a focus servo-circuit is provided in which recording or reproduction can be made by setting the pickup optical system or disc in a proper state even when the reflection factor fluctuates.

That is to say, in FIG. 3, in the CPU 11, the digital data output to set a focus level through the I/O port B 15 varies in turn and is converted to an analogue amount by the D/A converter 19. A signal gradually moving the objective lens 24 away from the disc 30 is applied on the actuator coil 25.

The FE signal $S_{FE}$, detected in each position of the objective lens 24 moved by a slight amount, is converted to digital data $DS_{FE}$ by an A/D converter 16. The signal is operated according to the flow chart shown in FIG. 7 by an arithmetic operation logical unit (ALU) 13, then the next digital data $DS_{FE}$ is input in turn and the same operation is made.

That is to say, when a discriminating level setting process beings, objective lens driving data output from the I/O port B 15 will be cleared and the respective digital data $DS_{FE\ MIN}$ and $DS_{FE\ MIN}$ of the maximum value $S_{FE\ MAX}$ and minimum value $S_{FE\ MIN}$ of the FE signal $S_{FE}$ will be set, for example at 0 and 255 in the register of the ALU 13 of the CPU 11 or in another register (or an appended memory). Even if the reflection factor of the disc 30 fluctuates, the A/D conversion level at the point in time when moving the objective lens 24 may be within the range of 0 to 255. The objective lens driving (moving) data output from the I/O port B 15 are increased by 1 step (for example, by 1 bit). The digital data $DS_{FER}$ of the FE signal $S_{FE}$ is then output from the photodetector 26 and converted by the A/D converter 16. The output data is compared with the above mentioned maximum value data $DS_{FE}$. A determination is made whether $DS_{FE} > DS_{FE\ MAX}$. When the digital data is greater than the maximum (YES), the data $DS_{FE}$ will be replaced with the $DS_{FE\ MAX}$. However, when the digital data is less than the maximum value (NO), whether $DS_{FE} < DS_{FE\ MIN}$ will then be determined. That is to say, when $DS_{FE} < DS_{FE\ MIN}$ is determined to be true (YES), the replacement will be made but, in case it is determined to be NO, the digital data of the I/O port B 15 will be increased by 1 step. Thus, the objective lens 24 will be moved by a slight amount from the disc 30. The digital data $DS_{FE}$ of the FE signal $S_{FE}$ will be determined by the ALU 13 through the A/D converter 16 as to whether $DS_{FE} > DS_{FE\ MAX}$ and $DS_{FE} < DS_{FE\ MIN}$ in turn as described above and, depending on the outcome of the determination, the replacement with the $DS_{FE\,MAX}$ or $DS_{FE\,MIN}$ will be made.

For example, in FIG. 7, in the initial sep 0, the objective lens 24 is set at a distance $L_o$ from the disc and, the digital data $DS_{FE}=DS_{co}$ of the FE signal $S_{FE}$ of the level $S_{co}$ is input. By the determination of $DS_{FE}$ (that is, $DS_{co}$)>0 and $DS_{FE}$ (that is, $DS_{co}$)<255, in case the respective conditions are established, the replacement of $DS_{FE\,MAX}=DS_{co}$ and $DS_{FE\,MIN}=DS_{co}$ is made.

In the next step 1, the objective lens 24 is moved by a slight amount and is set at a distance $L_1$. The same determination as described above is made by the FE signal in this state, and, when the determination is YES, the replacement will be made.

When this operation process is made in turn in the range including at least the servo-means pull-in region, the maximum value data $DS_{FE\,MAX}$ will be set substantially at the maximum value level $S_{MAX}(=S_2)$ in FIG. 6 and the minimum value data $DS_{FE\,MIN}$ will be substantially at the digital data corresponding to the minimum value level $S_{MIN}$.

Figure 7A:
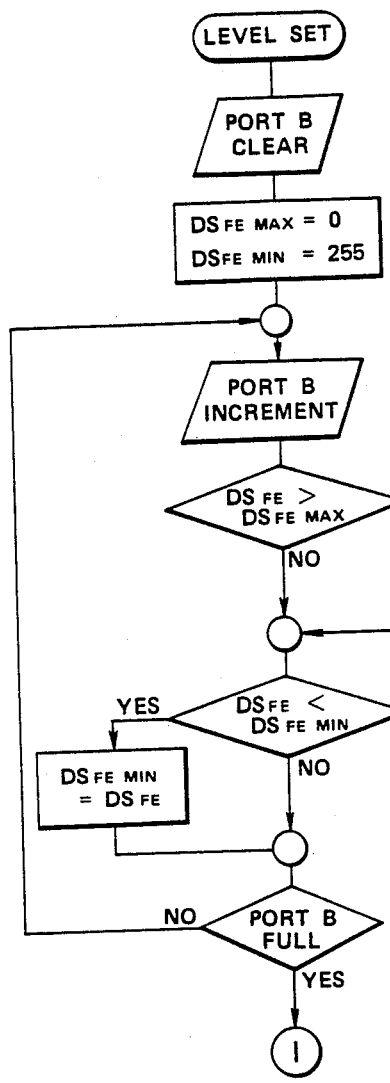
FIGS. 7a–d are flow charts for setting reference levels in the fourth embodiment of the present invention.
Figure 7B:
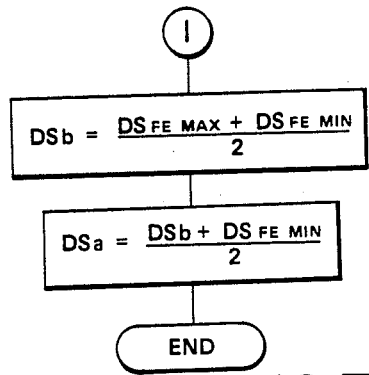
Figure 7C:
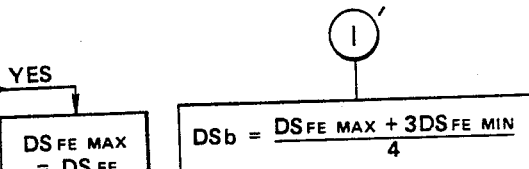
Figure 7D:
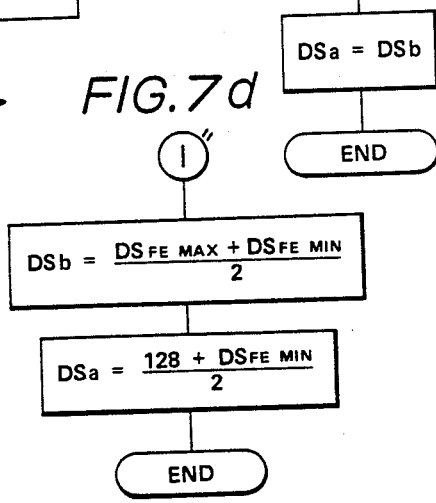

When the maximum value data $DS_{FE\,MAX}$ and minimum value data $DS_{FE\,MIN}$ are thus determined, the digital data $DS_b$ and $DS_a$ of the discriminating reference levels $S_b$ and $S_a$ will be determined by the arithmetic operation in FIG. 7b, 7c, or 7d.

In FIG. 7b, the level $S_b$ is set at the average value of the maximum value $S_{MAX}$ and minimum value $S_{MIN}$ and the level $S_a$ is set at the average value of the level $S_b$ and minimum value $S_{MIN}$.

$S_b$ and $S_1$ may be set not only as shown in FIG. 7b above but also as in FIG. 7c and 7d. In FIG. 7d, "128" means ½ of the maximum data of the digital conversion data.

The levels $S_b$ and $S_a$ are determined on the basis of the actual FE signal $S_{FE}$. Therefore, the levels will be properly set even when the reflection factor varies such as when the disc 30 is replaced. The levels will be set on the basis of the FE signal $S_{FE}$ output from the photodetector even when the photoelectric conversion efficiency or the like of the optical pickup system or photodetector 26 is different. Therefore the levels will not be substantially influenced by the optical pickup system or photodetector.

According to the above mentioned fourth embodiment, a discriminating level value can be determined without substantially requiring a memory or the like for containing data.

When the focus level is set as described above, the focus will be searched according to the flow chart shown in FIG. 4 or the like. After passing the above mentioned level $S_a$, at the time when the level is above the level $S_b$, the focus servo-means will be on, a focus loop will be formed and a just focus state will be quickly set.

In the above description, the objective lens 24 moves in a direction away from the disc 30 to set the focus level. However, the present invention is not limited to this. The objective lens may move in a direction approaching the disc 30.

In this case, it is desirable to have a more positive autofocus than at another level on the opposite side of level $S_a$ outside the focus pull-in region W to use for the determination in focus searching.

The system of setting the respective levels $S_a$ and $S_b$ is not limited to the one described above.

This embodiment can be extensively applied not only to optical recording and reproducing devices such as an optical disc but also to recording and reproducing devices such as photomagnetic disks.

It is desirable that the discriminating threshold value setting means of this embodiment is actually operated prior to the focus search. However, it need not always be operated before the focus search but may be operated periodically. Also, the controlling level can be held with a back up current source even when the current source is off and can be replaced with an amended or renewed value when the level is renewed.

The peak value can detect the maximum value through a holding circuit and can detect the minimum value through a peak holding circuit through a reversing circuit.

In the above mentioned first embodiment, the critical angle method has been described. Howver, the present means can be utilized also for other focus detecting systems such as an astigmatism method.

As described above, according to the fourth embodiment, when the focus search is actually made, the objective lens is moved. When the FE signal $S_{FE}$ reaches the discriminating level, prior to operating the focus servo-means, the objective lens will be moved in advance. The actual focus error signal waveform level will be examined and the discriminating level will be determined or amended in response to the waveform level so that the servo-means may be operated at a proper discriminating level value without being substantially influenced by the fluctuations of the optical system of the optical pickup, the photoelectric conversion efficiency of the photodetector and the reflection factor of the disc.

Therefore, the optical pickup can be positively set in a just focus state and the reliability of the device can be improved.

The device can be applied also to a recording medium which is diffeent than the standard reflection factor.

The allowable range of the fluctuation of the optical pickup can be made so large that mass-production and low cost can be met.

The step width of the step driving signal when the objective lens is gradually moved by the step driving signal, may be set in response to the level difference $S_{MAX}-S_{MIN}$ between the minimum value $S_1$ (or $S_{MIN}$) and maximum value $S_2$ (or $S_{MAX}$) on both sides of the focus pull-in region. That is to say, in case the level difference $S_{MAX}-S_{MIN}$ is small, the moving step width may be made small in focus searching and, in the reverse case, the moving step width may be made large.

For the step width moving within the pull-in region, the pitch width near the middle of the level difference $S_{MAX}-S_{MIN}$, that is, on the side near the just focus point, may be made narrower than the pitch width on both corner sides of the pull-in region.

I claim:

1. A focus servo-means comprising:
   an optical recording medium;
   a light source which generates light;
   a focus servo-loop means including
      an optical system for collecting the light generated by the light source and for projecting said light onto said optical recording medium,
      a focus actuator applies a driving signal to said optical system to move said optical system varying distances from said recording medium,
      a photodetector detects the light reflected from said recording medium,
      an error signal producing circuit connected to said photodetector, said error signal producing circuit for producing focus error signals corresponding to the light detected by said photodetector, and a driving circuit amplifies said focus error signals from said error signal producing circuit and outputs the amplified focus error signals as driving signals for said focus actuator;

a switch connected between said driving circuit and said error signal producing circuit, said switch opening and closing said focus servo-loop means;

a moving signal producing means for outputting a move signal to the driving circuit to move said optical system varying distances from said recording medium, said move signal being applied to said driving circuit when said switch is opened;

an ordered reference level setting means for setting a plurality of ordered reference levels from the focus error signal characteristics, at least one of said ordered reference levels being set within a focus pull-in region and at least one of said ordered reference levels being set outside said focus pull-in region;

a comparing means for successfully comparing over time said plurality of ordered reference levels with the focus error signal detected from said error signal producing circuit when said move signal is applied to said driving circuit; and a servo-starting means for closing said switch to set a focus servo-state when the focus error signal, from said error signal producing circuit which has said move signal applied to said driving circuit, is at least equal to said plurality of ordered reference levels as compared by said comparing means, said focus error signal being within said focus pull-in region when said focus servo-state is set.

2. A focus servo-means according to claim 1 wherein said moving signal producing means, comparing means and ordered reference level setting means are operated by a microcomputer.

3. A focus servo-means according to claim 1 wherein said moving signal is made smaller in width with the lapse of time within the focus pull-in region than outside said focus pull-in region.

4. A focus servo-means according to claim 1 wherein said moving signal is to move said optical system toward the focus pull-in region from a position therefor closer than the distance between said recording medium and focus pull-in region.

5. A focus servo-means according to claim 1 wherein said moving signal is to move said optical system toward the focus pull-in region from a position farther than the distance between said medium and focus pull-in region.

6. A focus servo-means according to claim 1 wherein said moving signal varies steppedly to rise or fall.

7. A focus servo-means according to claim 6 wherein the focus error signal is compared a plurality of times together with sampling in the comparing means during the movement of the optical system by one step of said stepped moving signal.

8. A focus servo-means according to claim 1 which is provided with an extreme value detecting means which keeps said switch open, applies a moving signal, has a focus error signal input and determines the maximum value and minimum value of the focus error signal and a reference level setting means setting said plurality of reference levels.

9. A focus servo-means according to claim 1 wherein said reference level within said focus pull-in region is set to be near to the focus level.

10. A focus servo-means according to claim 1 wherein the time variation width of said moving signal is set in response to the level difference between said maximum value and minimum value.

11. A focus servo-means according to claim 9 wherein the reference level within the focus pull-in region is a mean value of both levels of said maximum value and minimum value.

12. A focus servo-means according to claim 11 wherein the reference level outside the focus pull-in region is a mean value of the reference level within said focus pull-in region and the level of said minimum value.

13. A focus servo-means according to claim 8 wherein the reference level within the focus pull-in region is a mean value of 3 times the minimum value and the maximum value.

14. A focus servo-means according to claim 13 wherein the reference level outside the focus pull-in region is equal to said reference level within the focus pull-in region.

15. A focus servo-means according to claim 8 wherein the reference level outside said focus pull-in region is a mean value of half the maximum value level and minimum value level.

* * * * *